(12) United States Patent
Han

(10) Patent No.: US 12,067,479 B2
(45) Date of Patent: Aug. 20, 2024

(54) HETEROGENEOUS DEEP LEARNING ACCELERATOR

(71) Applicant: T-Head (Shanghai) Semiconductor Co., Ltd., Shanghai Free Trade Area (CN)

(72) Inventor: Liang Han, San Mateo, CA (US)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 1293 days.

(21) Appl. No.: 16/664,668

(22) Filed: Oct. 25, 2019

(65) Prior Publication Data

US 2021/0125042 A1    Apr. 29, 2021

(51) Int. Cl.
    *G06N 3/063*  (2023.01)
    *G06N 3/08*   (2023.01)
    *G06N 5/04*   (2023.01)

(52) U.S. Cl.
    CPC .............. *G06N 3/063* (2013.01); *G06N 3/08* (2013.01); *G06N 5/04* (2013.01)

(58) Field of Classification Search
    CPC ............. G06N 3/063; G06N 3/08; G06N 5/04
    See application file for complete search history.

(56) References Cited

U.S. PATENT DOCUMENTS

| 10,452,977 | B2 * | 10/2019 | Son ....................... G06N 3/063 |
| 2009/0313195 | A1 * | 12/2009 | McDaid ................. G06N 3/063 706/26 |
| 2012/0303932 | A1 * | 11/2012 | Farabet .................. G06N 3/045 712/30 |
| 2020/0082269 | A1 * | 3/2020 | Gao ....................... G06N 3/084 |
| 2020/0175396 | A1 * | 6/2020 | Boyce ..................... G06N 3/063 |
| 2020/0341762 | A1 * | 10/2020 | Ramesh ................... G06F 9/546 |
| 2021/0081209 | A1 * | 3/2021 | Meswani ................. G06N 3/08 |

* cited by examiner

*Primary Examiner* — Kamran Afshar
*Assistant Examiner* — Brian J Hales
(74) *Attorney, Agent, or Firm* — Finnegan, Henderson, Farabow, Garrett & Dunner, LLP

(57) ABSTRACT

Systems and methods for heterogenous hardware acceleration are disclosed. The systems and methods can include a neural network processing unit comprising compute tiles. Each of a first set of the compute tiles can include a first tensor array configured to support operations in a first number format. Each of a second set of the compute tiles can include a second tensor array configured to support operations in a second number format, the second number format supporting a greater range or a greater precision than the first number format, and a de-quantizer configured to convert data in the first number format to data in the second number format. The systems and methods can include neural network processing units, multi-chip hardware accelerators and distributed hardware accelerators including low-precision components for performing interference tasks and high-precision components for performing training tasks. Transfer learning tasks can be performed using low-precision components and high-precision components.

23 Claims, 8 Drawing Sheets

HETEROGENEOUS DEEP LEARNING ACCELERATOR

BACKGROUND

Development of neural network applications, particularly deep neural network applications, generally requires dedicated artificial intelligence hardware accelerators, as neural network training and inference are computationally intensive. Such hardware accelerators can be designed to emphasize computing power and flexibility (e.g., combining multiple NVIDIA T4 Tensor Core GPUs configurable to support 4-bit integer, 8-bit integer, 16-bit floating point, and 32-bit floating point operations; or multiple NVIDIA Tesla V100 Data Center GPUs configurable to support 8-bit integer, 16-bit floating point, 32-bit floating point, and 64-bit floating point operations). This computing power and flexibility is expensive: dedicated artificial intelligence hardware accelerators can sell for up to a half-million dollars each.

Small-scale users (e.g., small businesses, small software developers, individuals, or the like) may not be able to afford such dedicated artificial intelligence hardware accelerators. But these users may be unwilling to purchase access to hardware accelerators controlled by independent service providers, for reasons of data privacy, data sharing, data security, configurability, and the like. Furthermore, small-scale users may focus on transfer learning—reusing an established, pre-trained model, such as VGG Net, ResNet, Bert, etc., as the backbone of a new model—rather than training new models from scratch. The computing power and flexibility of existing hardware accelerators may be wasted on such transfer-learning tasks.

SUMMARY

The disclosed systems and methods include heterogenous hardware acceleration devices and systems including low-precision components and high-precision components. In some embodiments, inference tasks (or the inference portion of transfer learning) can be performed by the low-precision components, while training tasks can be performed by the high-precision components. In mixed-precision embodiments, training tasks can also use low-precision components.

The disclosed embodiments include a neural network processing unit. The neural network processing unit can include a first set of compute tiles, each comprising a first tensor array configured to support operations in a first number format. The neural network processing unit can also include a second set of compute tiles. Each of the second set of compute tiles can include a second tensor array configured to support operations in a second number format supporting a greater range or a greater precision than the first number format. Each of the second set of compute tiles can also include a de-quantizer configured to convert data in the first number format to data in the second number format.

In some embodiments, the first tensor array of one of the first set of compute tiles can be configurable to write an output in the first number format directly into a local memory of another one of the first set of compute tiles.

In various embodiments, the first tensor array of one of the first set of compute tiles can be configurable to write an output in the first number format directly into the de-quantizer of one of the second set of compute tiles.

In some embodiments, the neural network processing unit can be configurable to perform a first inference task and a second inference task. The first inference task can be performed using a subset of the first set of compute tiles. The first transfer learning task can be performed using an output of the first inference task and the second set of compute tiles.

In various embodiments, the neural network processing unit can be configurable to perform a second inference task using a second subset of the first set of compute tiles during performance of the first inference task.

In some embodiments, in a first mode, the neural network processing unit can be configurable to assign the first set of compute tiles to an inference task and assign a compute tile of the second set of compute tiles to a transfer learning task.

In various embodiments, in a second mode, the neural network processing unit can be configurable to assign a first subset of the first set of compute tiles to an inference task; and assign a second subset of the first set of compute tiles and a compute tile of the second set of compute tiles to a transfer learning task.

In some embodiments, compute tiles of the first and second sets can be configurable to write directly into a local memory of another compute tile according to an interconnection topology. Compute tiles of the first and second sets can be configurable to write indirectly into a local memory of another compute tile using one or more routers.

In some embodiment, the one or more routers can include a router for each compute tile. In various embodiments, the interconnection topology can include a linear bus, a one-way ring bus, a 2d mesh, or a 2d torus.

In various embodiments, the first set of compute tiles can be configurable to form a sequence of compute tiles. A final compute tile in the sequence can be configured to provide an output of the final compute tile to a de-quantizer of one of the second set of computer tiles. Each remaining compute tile in the sequence can be configured to write directly an output of the remaining compute tile into a local memory of a subsequent compute tile in the sequence.

In some embodiments, the first number format can be a two-bit integer format, an eight-bit integer format, or a four-bit integer format. The second number format can be a sixteen-bit floating point format, a thirty-two-bit floating point format, or a sixteen-bit brain floating point format.

The disclosed embodiments include a neural network processing system. The neural network processing system can include at least one inference processing unit and at least one training processing unit. The at least one inference processing unit can be configured to support operations in a first number format. The at least one training processing unit can be configured to support operations in a second number format, the second number format supporting a greater range or a greater precision than the first number format. The at least one inference processing units can be communicatively connected to the at least one training processing unit.

In some embodiments, the neural network processing system can further comprise a host unit connected to the at least one inference processing unit and the at least one training processing unit using a computer bus.

In various embodiments, the neural network processing system can further comprise an interconnect topology. The interconnect topology can connect: one of the at least one inference processing unit, one of the at least one training processing unit, or one of the at least one inference processing unit and one of the at least one inference processing unit.

In some embodiments, the interconnect topology can include a chip-to-chip interconnect topology. In various embodiments, the neural network processing system can further include communicatively interconnected servers, each server hosting at least one of an inference processing unit or a training processing unit. In some embodiments, the neural network processing system can further include a dedicated switch unit for managing communications between the servers.

The disclosed embodiments include an additional neural network processing unit. The additional neural network processing unit can include first tensor arrays configured to perform operations in a first number format and second tensor arrays configured to perform operations in a second number format. The second number format can support a greater range or a greater precision than the first number format. The neural network processing unit can be configurable to, in a first mode, restrict the first tensor arrays to inference tasks and restrict the second tensor arrays to training tasks, and, in a second mode, assign to a transfer learning task a first subset of first tensor arrays and a first subset of the second tensor arrays.

In some embodiments, the neural network processing unit can be further configurable to, in the second mode, assign to an inference task a second subset of first tensor arrays.

In various embodiments, the neural network processing unit can further include de-quantizers associated with the second tensor arrays and configured to convert data in the first number format to data in the second number format.

In some embodiments, the neural network processing unit can further include at least one router and can be configurable to transfer an output of one of the first sensor arrays to one of the de-quantizers using the at least one router.

In various embodiments, one of the first tensor arrays can be configurable to write directly into a memory associated with another one of the first tensor arrays. In some embodiments, one of the first tensor arrays can be configurable to write directly into a de-quantizer associated with one of the second tensor arrays.

The disclosed embodiments include a method. The method can include configuring a first set of compute tiles to perform an inference portion of a transfer learning task in a first number format. The method can further include configuring a second set of compute tiles to receive an inference output in the first number format from the first set of compute tiles. The method can include converting the inference output to a second number format supporting a greater range or a greater precision than the first number format. The method can include performing a training portion of the transfer learning task in the second number format using the converted inference output and performing the transfer learning task using the first set of compute tiles and the second set of compute tiles.

In various embodiments, configuring the first set of compute tiles to perform an inference portion of a transfer learning task can include configuring one of the first set of compute tiles to directly write an output in the first number format into the de-quantizer of one of the second set of compute tiles.

In some embodiments, configuring the first set of compute tiles to perform an inference portion of a transfer learning task can include configuring a first subset of the first set of compute tiles to perform the inference portion of the transfer learning task; and configuring a second subset of the first set of compute tiles to perform a second inference task during performance of the inference portion of the transfer learning task.

In various embodiments, configuring the first set of compute tiles to perform the inference portion of the transfer learning task can include configuring the first set of compute tiles to form a sequence of compute tiles. Configuring the first set of compute tiles to form a sequence of compute tiles can include configuring a final compute tile in the sequence to provide an output of the final compute tile to a de-quantizer of one of the second set of computer tiles, and configuring each remaining compute tile in the sequence to write directly an output of the remaining compute tile into a local memory of a subsequent compute tile in the sequence.

In some embodiments, the first number format can be a two-bit integer format, an eight-bit integer format, or a four-bit integer format. The second number format can be a sixteen-bit floating point format, a thirty-two-bit floating point format, or a sixteen-bit brain floating point format.

In various embodiments, the first set of compute tiles and the second set of compute tiles can be part of a neural processing unit. Configuring the first set of compute tiles and the second set of compute tiles can include providing instructions to the neural processing unit.

The disclosed embodiments include a device. The device can include a host unit and a neural processing unit. The neural processing unit can be configurable by the host unit to perform operations in a first number format and a second number format. The neural processing unit can be configurable by the host unit to perform operations in the first number format using a first set of compute tiles of the neural processing unit, each of the first set of compute tiles including a first tensor array configured to support the operations in the first number format. The neural processing unit can be configurable by the host unit to perform operations in the second number format using a second set of compute tiles of the neural processing unit. Each of the second set of compute tiles can include a second tensor array configured to support the operations in the second number format and a de-quantizer configured to convert data in the first number format to data in the second number format.

In some embodiments, the neural processing unit can be further configurable by the host unit to write outputs from the first tensor array of one of the first set of compute tiles directly into a local memory of another one of the first set of compute tiles.

In various embodiments, the neural processing unit can be further configurable by the host unit to write outputs from the first tensor array of one of the first set of compute tiles, the outputs in the first number format, directly into the de-quantizer of one of the second set of compute tiles.

In some embodiments, the neural processing unit can be further configurable by the host unit to perform a first inference task using a subset of the first set of compute tiles, and a first transfer learning task using an output of the first inference task and the second set of compute tiles.

In various embodiments, the neural processing unit can be further configurable by the host unit to perform a second inference task using a second subset of the first set of compute tiles during performance of the first inference task.

In some embodiments, the neural processing unit can be further configurable by the host unit to enter a first mode, the neural processing unit in the first mode configured to assign the first set of compute tiles to an inference task, and assign a compute tile of the second set of compute tiles to a transfer learning task.

In various embodiments, the neural processing unit can be further configurable by the host unit to enter a second mode, the neural processing unit in the second mode configured to assign a first subset of the first set of compute tiles to an inference task, and assign a second subset of the first set of compute tiles and a compute tile of the second set of compute tiles to a transfer learning task.

In some embodiments, the compute tiles of the first and second sets can be configurable to write directly into a local memory of another compute tile according to an interconnection topology. The compute tiles of the first and second sets can also be configurable to write indirectly into a local memory of another compute tile using one or more routers. In various embodiments, the one or more routers can include a router for each compute tile. In some embodiments, the interconnection topology can include a linear bus, a one-way ring bus, a 2d mesh, or a 2d torus.

In some embodiments, the first set of compute tiles are configurable to form a sequence of compute tiles. A final compute tile in the sequence can be configured to provide an output of the final compute tile to a de-quantizer of one of the second set of computer tiles. Each remaining compute tile in the sequence can be configured to write directly an output of the remaining compute tile into a local memory of a subsequent compute tile in the sequence. In some embodiments, the first number format is a two-bit integer format, an eight-bit integer format, or a four-bit integer format. The second number format can be a sixteen-bit floating point format, a thirty-two-bit floating point format, or a sixteen-bit brain floating point format.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
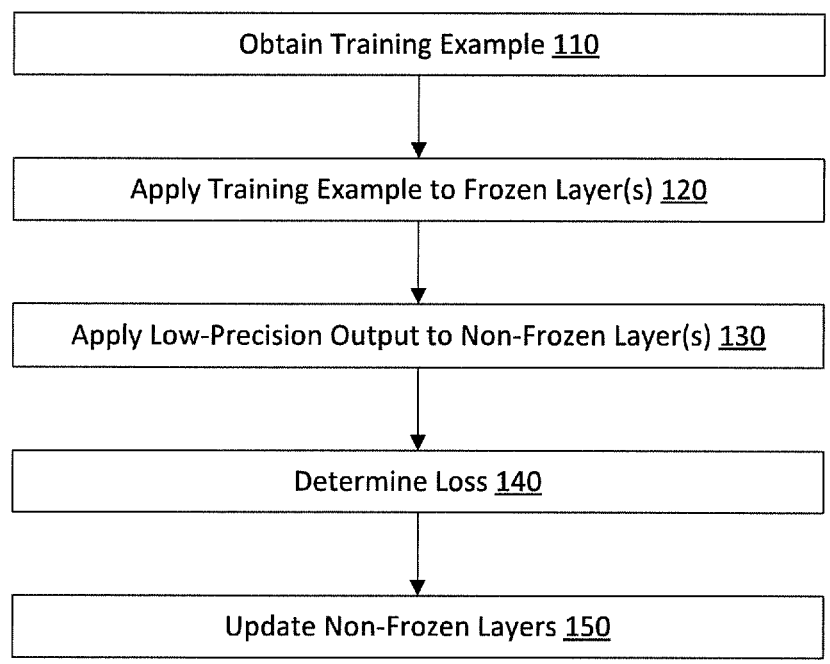
FIG. 1 depicts a flowchart of an exemplary transfer learning task performed on a neural network including multiple layers, in accordance with some embodiments of the present disclosure.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed systems and methods include heterogenous hardware acceleration devices and systems including low-precision components and high-precision components. In some embodiments, inference tasks (or the inference portion of transfer learning) can be performed by the low-precision components, while training tasks can be performed by the high-precision components. In mixed-precision embodiments, training tasks can also use low-precision components. The low-precision hardware accelerators can be cheaper and simpler than the high-precision hardware accelerators. In this manner, the disclosed embodiments provide an efficient alternative to systems or devices built around homogenous combinations of high-precision, high-flexibility hardware accelerators.

The disclosed embodiments can be implemented as compute tiles in a neural processing unit, processing units (e.g., GPUs, CPUs or the like) in a multi-processor system, or combinations of neural processing units or multi-processor systems connected into a distributed system. The disclosed embodiments can be configured to support multi-tasking, enabling simultaneous execution of inference and training or transfer-learning tasks.

High-precision number formats, as used herein, can be 16-bit floating point formats, 32-bit floating point formats, 64-bit floating point formats, 16-bit brain floating point formats, 32-bit brain floating point formats, or 64-bit brain floating point formats. Low-precision number formats, as used herein, can be 2-bit integer formats, a 4-bit integer formats, 8-bit integer formats, 16-bit integer format, 32-bit integer formats, or 64-bit integer formats. More generally, in some embodiments, a hardware accelerator can support a low-precision format and a high-precision format, with the high-precision format having greater precision than the low-precision format. Low-precision components can be configured to perform operations in a low-precision number format, while high-precision components can be configured to perform operations in a high-precision number format. As would be appreciated by those of skill in the art, a component configured to perform arithmetic operations in a low-precision number format (e.g., 8-bit integers) can be smaller and less complicated than a component configured to perform arithmetic operations in a low-precision number format (e.g., 32-bit floating point numbers).

FIG. 1 depicts a flowchart of an exemplary transfer learning task 100 performed on a neural network including multiple layers, in accordance with some embodiments of the present disclosure. The neural network may have been trained for a first task (e.g., a general computer vision classification task or the like). Transfer learning may be intended to adapt the neural network for use in a second task. The second task can be related to the first task. For example, when the first task comprises general identification of animals (e.g., cat, pig, dog, horse, etc.), the second task can comprise a more specific identification of a particular type of animal (e.g., bulldog, poodle, beagle, greyhound, etc.). Transfer learning can be performed by freezing parameters (e.g., weights, biases, pooling and unpooling locations, or the like) of some of the layers of the neural network, while updating the parameters of the remaining layers of the neural network using training data adapted to the second task. The frozen layers can comprise initial layers of the neural network. For example, when retraining a ResNet neural network comprising 154 layers, the first 152 layers may be frozen.

The transfer learning task can include applying training data to the neural network to generate output data, determining a loss associated with the output data, and updating the weights of the non-frozen layers of the neural network. The transfer learning task is not limited to a particular training framework, and can be performed using stochastic gradient descent, batch gradient descent, mini-batch gradient descent, or any variation thereof.

In step 110, a training system can obtain a training example. The training example can be part of a corpus of training data. The training data can be labeled. The training system can be configured to generate the training, receive the training example from another system, or retrieve the training example from a computer memory accessible to the training system.

In step 120, the training system can apply the training example to one or more low-precision hardware accelerators implementing the frozen layers of the neural network. Examples of neural network processing units, multi-chip systems, and distributed systems including such hardware accelerators are provided herein. In some embodiments, applying the training example to the frozen layers can include converting the training example into a number format of the one or more low-precision hardware accelerators. In this manner, the training system can use the one or more low-precision hardware accelerators to generate a low-precision output.

In step 130, the training system can apply the low-precision output to one or more high-precision hardware accelerators implementing the non-frozen layers of the neural network. Examples of neural processing units, multi-chip systems, and distributed systems including such hardware accelerators are provided herein. In some embodiments, applying the low-precision output to the non-frozen layers can include converting the low-precision output into a number format of the one or more high-precision hardware accelerators. The training system can convert the low-precision output using one or more de-quantizers associated with the one or more high-precision hardware accelerators. For example, each of the high-precision hardware accelerators can include a de-quantizer. In this manner, the training system can use the high-precision hardware accelerators to generate a neural network output. As a non-limiting example, depending on the transfer learning task, the output can be a class, a predicted value, or a similar machine learning output.

In step 140, the training system can determine a loss based on the neural network output. In some embodiments, as described above, the training data can be labeled. The training system can be configured to determine the loss using the neural network output, a loss function, and a label associated with the training example. The disclosed embodiments are not limited to any particular method for determining the loss.

In step 150, the training system can update the parameters of the non-frozen layers using the loss determined in step 140. In some embodiments, updating can begin with the determined loss function and proceed backwards, updating parameters layer by layer, until the parameters for all of the non-frozen layers have been updated. Many updating algorithms are known in the art, and the disclosed embodiments are not limited to a particular updating algorithm.

In some embodiments, the training system can be configured to begin calculation of a low-precision output corresponding to next training example while the non-frozen layers are being updated using a loss generating using the current training example. Such pipelining of the low-precision and high-precision hardware accelerators can speed transfer learning using the disclosed embodiments.

Steps 110 to 150, disclosed herein, can be performed iteratively until a termination condition is satisfied. In some embodiments, the termination condition can be or depend upon an quality metric, such as a weighted or unweighted mean squared error, mean absolute error, or mean absolute percentage error; a confusion matrix or metric derivable from a confusion matrix (e.g., accuracy, true positive rate, false negative rate, etc.); or another suitable quality metric. In various embodiments, the termination condition can be or depend upon an elapsed time, number of training epoch, or another similar condition. The disclosed embodiments are not limited to a particular termination condition.

Figure 2A:
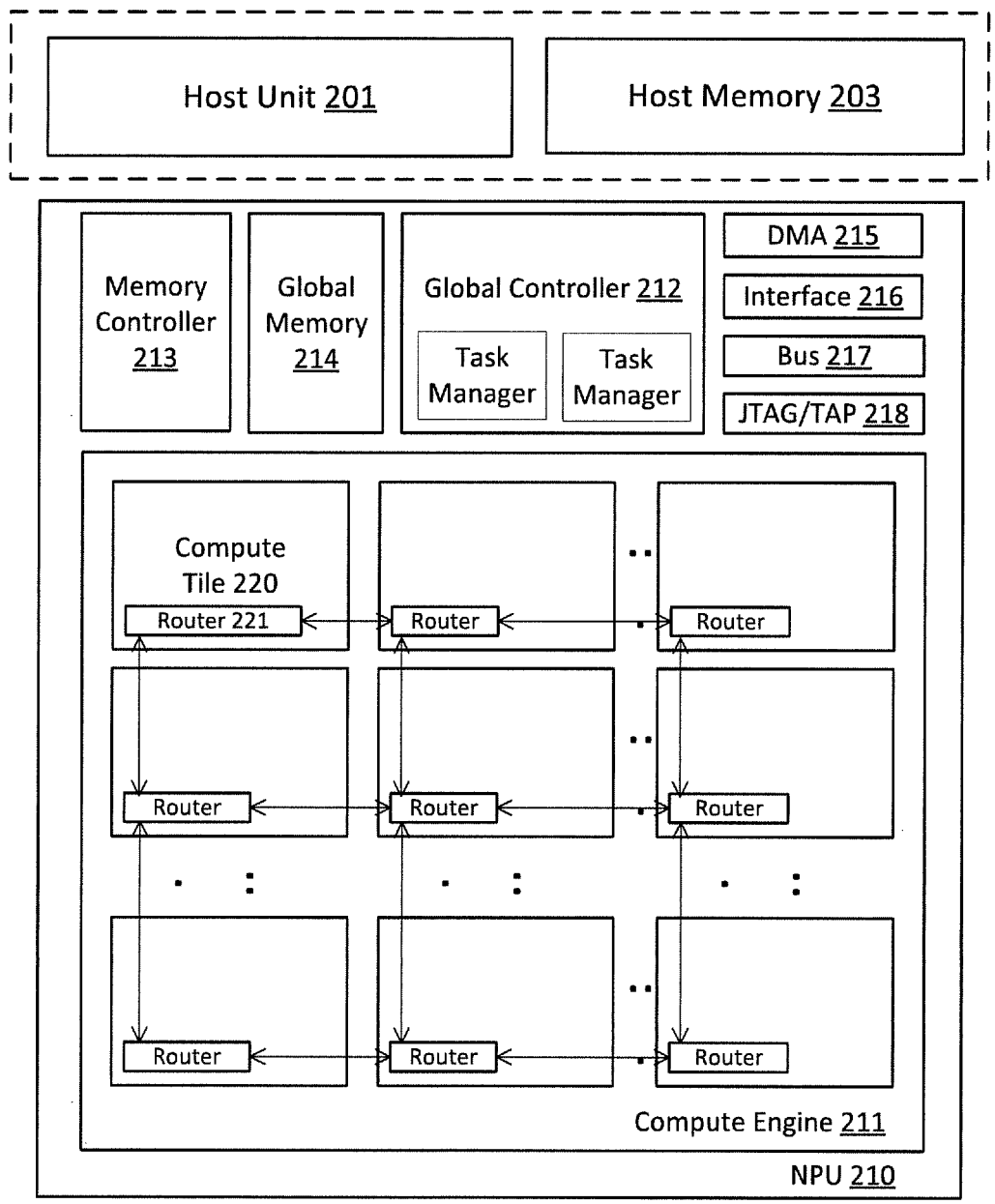
FIG. 2A depicts an exemplary parallel computing architecture suitable for implementing the transfer learning depicted in FIG. 1, in accordance with some embodiments of the present disclosure.

FIG. 2A depicts an exemplary parallel computing architecture 200 suitable for implementing the transfer learning depicted in FIG. 1, according to embodiments of the disclosure. As shown in FIG. 2A, architecture 200 can include a neural processing unit (NPU 210) and a host including a host unit 201 and a host memory 203. It is appreciated that NPU 210 can perform algorithmic operations (e.g., machine learning operations) based on communicated data. For example, exemplary parallel computing architecture 200 can be configured by instructions (e.g., instructions in a computer program) to implement the transfer learning depicted in FIG. 1. In some embodiments, the instructions can be stored in one or more non-transitory computer media. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. In various embodiments, the instructions can comprise transitory information, such as signals propagating through a computing device, computer system, or network of computer systems.

NPU 210 can include a compute engine 211, global controller 212, memory controller 213, global memory 214, direct memory access (DMA) unit 215, interface 216, bus 217, and Joint Test Action Group (JTAG)/Test Access End (TAP) controller 218, and the like. NPU 210 can be configured to implement one or more neural networks (e.g., the neural network updated according to the transfer learning process of FIG. 1). The one or more neural networks can be implemented using high- and low-precision compute tiles comprising compute engine 211.

The compute tiles, described in detail below with regards to FIG. 2B, can include a local memory, a compute unit, and a router (e.g., router 221). When NPU 210 is not assigned a training or transfer learning task, high-precision compute tiles in NPU 210 may be powered off (the routers for these tiles may remain powered, to enable packet forwarding). Normal training tasks (e.g., a non-transfer learning task in which no layers are frozen) may be mapped entirely to high-precision compute tiles in NPU 210. In mixed-precision embodiments, low-precision compute tiles and high-precision compute tiles in NPU 210 can be mapped to training tasks. Inference tasks, either stand-alone inference tasks or as part of transfer learning, may be mapped entirely to low-precision compute tiles in NPU 210. When NPU 210 is not assigned an inference task, low-precision compute tiles in NPU 210 may be powered off (the routers for these tiles may remain powered, to enable packet forwarding).

NPU 210 or the host system can be configured to determine a mapping from layers of a neural network to hardware resources of NPU 210. This mapping can depend on the hardware resources of NPU 210 and the computation and memory requirement of each layer of the neural network. In some embodiments, the mapping can depend on a hardware acceleration mode.

NPU 210 can be configurable to support different hardware acceleration modes. In some embodiments, the hardware acceleration mode can be a property of global controller 212 and may be readable or settable by the host system, or another device. A first hardware acceleration mode can prioritize transfer learning, while a second hardware acceleration mode can prioritize inferential tasks.

In the transfer learning mode, high-precision computing tiles of NPU 210 can be assigned to implement transfer learning tasks. Low-precision tiles of NPU 210 can be allocated to either transfer learning tasks or inference tasks. In some instances, the allocation of compute tiles between tasks can be balanced. For example, NPU 210 can be configured to divide low-precision compute tiles equally, or approximately equally, between the tasks assigned to NPU 210. In various implementations, the allocation of low-precision compute tiles can favor either transfer learning tasks or inference tasks.

In the inferential mode, low-precision computing tiles of NPU 210 can be assigned to implement inference tasks. Low-precision compute tiles may not be assignable to transfer learning tasks. Only the high-precision compute tiles may be assignable to training tasks, including transfer learning tasks.

As described above, compute engine 211 can include a plurality of compute tiles (e.g., compute tile 220). Exemplary compute engine arrangements are described below with regards to FIGS. 3A and 3B. Compute engine 211 can be configured to implement the layers of one or more neural networks using sets of one or more compute tiles. For example, the frozen layers of a neural network in a transfer learning task can be implemented by low-precision compute tiles, while the unfrozen final layers of the neural network in the transfer learning task can be implemented by high-precision compute tiles.

Compute engine 211 can be configured to support interconnections between the compute tiles for passing data or instructions. In some embodiments, compute engine 211 can be configured to support two or more sets of interconnections. A first set of interconnections can provide an indirect way of passing data or instructions between compute tiles. A second set of interconnections can provide a direct way to pass data or instructions between compute tiles.

The first set of interconnections between the compute tiles can form a network connecting the compute tiles, according to some embodiments. This network can be a router-based, packet-switched network. The physical topology of the network can be a linear bus, a one-way ring bus, a 2-d mesh, a 2-d torus, or the like. The packet-switched network can be configured to enable compute tiles to communicate indirectly with other compute tiles or other components of NPU 210 (e.g., one or more of global controller 212, memory controller 213, global memory 214, DMA unit 215, interface 216, bus 217, JTAG/TAP Controller 218, or the like). For example, an origin compute tile can provide data or instructions to a router associated with the origin compute tile, which can route the data or instructions to a destination compute tile through zero or more intermediate routers. As a further example, a compute tile can be configured to receive instructions from global controller 212, or data from memory controller 213 indirectly through a router associated with the compute tile. In some embodiments, each compute tile can include a router associated with that compute tile. In various embodiments, compute engine 211 can include one or more routers configured to route data or instructions to each of the compute tiles.

The second set of interconnections between the compute tiles can enable a compute tile to write data or instructions directly into another compute tile, according to some embodiments. Directly writing the data or instructions into the other compute tile may be faster than indirectly providing data or instructions to the other compute tile through the first communication network. However, each compute tile may only be able to directly write data or instructions to a subset of the other compute tiles in the compute engine. For example, a compute tile may only be able to directly write data or instructions into a single adjacent compute tile.

A compute tile may be configured to write data or instructions directly into a local memory of another compute tile configured to perform operations at the same level of precision. For example, a low-precision compute tile can be configured to directly write data or instructions into the local memory of another low-precision compute tile. Likewise, a high-precision compute tile can be configured to directly write data or instructions into the local memory of another high-precision compute tile. A low-precision compute tile may be configured to write data directly into a de-quantizer of a high-precision compute tile. The de-quantizer can be configured to convert the received data into a number format used by the high-precision compute tile.

Global controller 212 can include at least one task manager. Each task manager can be configured to coordinate the operations of one or more compute tiles (e.g., compute tile 220). For example, such a task manager can be configured to generate instructions for implementing network layers and to route those instructions to the appropriate compute tiles in compute engine 211. In some embodiments, global controller 212 can support multi-tasking by configuring sets of compute tiles to perform multiple sequences of commands in parallel.

Memory controller 213 can be configured to manage the reading and writing of data to and from a specific memory block within global memory 214 having on-chip memory blocks (e.g., 4 blocks of 8 GB second-generation, high-bandwidth memory (HBM2)) to serve as main memory. For example, memory controller 213 can manage read/write data coming from outside NPU 210 (e.g., from DMA unit 215 or a DMA unit corresponding with another neural processing unit) or from inside NPU 210 (e.g., from a local memory of a compute tile, such as compute tile 220, via a interconnect, such as a 2D mesh network, controlled by a task manager of global controller 212). Moreover, while one memory controller is shown in FIG. 2A, it is appreciated that more than one memory controller can be provided in architecture 200. For example, there can be one memory controller for each memory block (e.g., HBM2) within global memory 214.

Memory controller 213 can be configured to generate memory addresses and initiate memory read or write cycles. Memory controller 213 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

DMA unit 215 can assist with transferring data between host memory 203 and global memory 214. In addition, DMA unit 215 can assist with transferring data between multiple NPUs (e.g., between NPU 210 and other NPUs). DMA unit 215 can allow off-chip devices to access both on-chip and off-chip memory without causing a CPU interrupt. Thus, DMA unit 215 can also generate memory addresses and initiate memory read or write cycles. DMA unit 215 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that architecture 200 can include a second DMA unit, which can be used to transfer data between other neural network processing architectures to allow multiple neural network processing architectures to communication directly without involving the host CPU.

Interface 216 (such as a PCIe interface), if present, can serve as an inter-chip bus, providing communication between architecture 200 and a host system, or between architecture 200 and other devices. For example, in some embodiments, architecture 200 can be configured as a PCIe device of the host system. Other peripherals may then connect into the PCIe interface of the host system. The host system may then orchestrate communications between architecture 200 and the other peripherals. Bus 217 can enable communication between instances of chip communication system 402 in a system. Bus 217 can include on-chip communication modules or ports.

JTAG/TAP controller 218 can specify a dedicated debug port implementing a serial communications interface (e.g., a JTAG interface) for low-overhead access to NPU 210 without requiring direct external access to the system address and data buses. JTAG/TAP controller 218 can also have on-chip test access interface (e.g., a TAP interface) that implements a protocol to access a set of test registers that present chip logic levels and device capabilities of various parts.

Architecture 200 can also include a host unit 201. Host unit 201 can be one or more processing unit (e.g., an X86 central processing unit). In some embodiments, architecture 200 can include a host system having host unit 201 and host memory 203. In some embodiments, a user can interact with a development environment (e.g., TensorFlow or the like) that is provided by the host unit to design a neural network. In some embodiments, the host system can also include a compiler (not shown). The compiler can include a program or computer software that transforms computer codes written in one programming language into neural processing unit instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof. For example, the compiler can analyze the control flow graph of the program and identify, based on the architecture and capabilities of NPU 210, portions of the program that can be executed by compute engine 211. The compiler can generate a sequence of instructions for performing each of the portions of the program.

When the compiler on the host system generates instructions for implementing neural networks using NPU 210, the host system can push these instructions to NPU 210. The instructions can be pushed serially, upon execution of the program. Based on these instructions, each task manager of global controller 212 can assign one or more compute tiles (e.g., compute tile 220) to a task, such as an inference task, training task, or transfer learning task. Some commands pushed to NPU 210 can instruct DMA unit 215 to load the instructions (generated by the compiler) and data from host memory 203 into global memory 214. The loaded instructions can then be distributed to each compute tile assigned with the corresponding task, and the one or more compute tile can process these instructions to perform the assigned task. After NPU 210 is configured to perform the desired portions of the program, the host system can provide a command instructing NPU 210 to begin executing the received instructions.

Host memory 203 can be off-chip memory such as a host CPU's memory. For example, host memory 203 can be a DDR memory (e.g., DDR SDRAM) or the like. Host memory 203 can be configured to store a large amount of data with slower access speed, compared to the on-chip memory integrated within one or more processors, acting as a higher-level cache.

The specific architecture disclosed in FIG. 2A is not intended to be limiting. As would be appreciated by those of skill in the art, architecture 200 can include fewer components or additional components. For example, NPU 210 may not include JTAG/TAP controller 218, bus 217, interface 216, or another communication component. As an additional example, NPU 210 may include additional memory controllers or compute engines. As a further example, the host system may include additional host units or host memories.

Figure 2B:
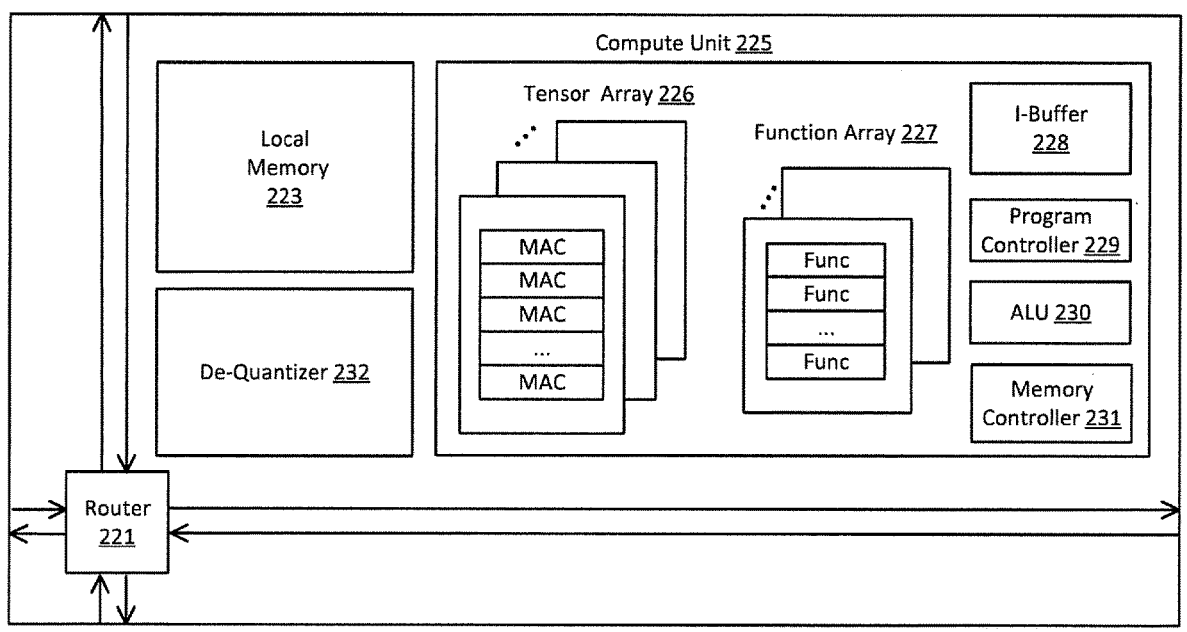
FIG. 2B depicts an exemplary computing tile architecture, in accordance with some embodiments of the present disclosure.

FIG. 2B depicts an exemplary computing tile architecture (e.g. of compute tile 220), in accordance with some embodiments of the present disclosure. As shown, compute tile 220 can include a router 221, a local memory 223, and a local compute unit 225. In some embodiments, high-precision compute tiles can further include a de-quantizer 232. Compute tile 220 can be configured to receive data and instructions from router 221 (or through a direct write into local memory 223). The compute tile 220 can use the local compute unit 225 and the local memory 223 to process the received data according to the received instructions. As described above, router 221 can be configured to connect compute tile 220 with other compute tiles in NPU 210, or other components of NPU 210.

Local memory 223 can be configured for use by local compute unit 225. Local memory 223 can include computer memory configured as scratchpad memory. For example, local memory 223 can be configured to buffer input and output data for local compute unit 225. As an additional example, local memory 223 can be used to store temporary or intermediate results for further processing by local compute unit 225. Local memory 223 can be implemented using SRAM, though the disclosed embodiments are not limited to such an implementation of local memory 223.

Local compute unit 225 can be configured to generate output data from input data according to stored instructions. For example, local compute unit 225 can implement one or more layers of a neural network, processing layer inputs into layer outputs according to stored parameters (e.g., weights, biases, and the like). Local compute unit 225 can include tensor array 226, function array 227, instruction buffer 228, program controller 229, arithmetic logic unit 230, and local memory controller 231.

Tensor array 226 of local compute unit 225 can be configured to rapidly perform arithmetic operations in parallel on input data received from local memory 223 (e.g., as the result of a load operation performed by local memory controller 231). In some embodiments, tensor array 226 can comprise a number of arithmetic circuits, such as multiplier circuits, adder circuits, or multiply-accumulator circuits (e.g., MAC circuits). For example, tensor array 226 can include between a hundred arithmetic circuits and ten thousand arithmetic circuits. In some embodiments, the arithmetic circuits can be pipelined. For example, the arithmetic circuits can be arranged in a plurality of dimensions of SIMD groups. As an additional example, the arithmetic circuits can be arranged as a systolic array. The particular implementation of the arithmetic circuits in tensor array 226 is not intended to be limiting.

In some embodiments, tensor array 226 can be arranged as an array of computational paths. Each frill width path can be divided into multiple narrower paths for processing less precise number formats. As a non-limiting example, a tensor array designed to process an array of eight 16-bit integers can be alternatively configured to process an array of sixteen 8-bit integers or thirty-two 4-bit integers. Similarly, a tensor array designed to process an array of eight 32-bit floating point numbers can be alternatively configured to process an array of sixteen 16-bit floating point numbers or an array of thirty-two 8-bit floating point numbers.

Function array 227 of local compute unit 225 can be configured to perform operations commonly used for deep learning (e.g., pooling or unpooling operations; or application of activation functions like ReLu, Sigmoid, Tanh, or the like to layer outputs). Function array 227 can be arranged as an array of vector units, though the disclosed embodiments are not limited to such an implementation of function array 227.

Instruction buffer 228 can be configured to store instructions for execution by other components of local compute unit 225. Program controller 229 can include a sequencer configured to generate addresses for controlling the execution order of instructions by the local compute unit 225. Arithmetic logic unit 230 can be a scalar arithmetic logic unit available for general-purpose computations by local compute unit 225. Local memory controller 231 can be configured to generate memory addresses and initiate memory read or write cycles. Local memory controller 231 can specify some combination of a location within local memory 223, a destination within local compute unit 225, and a direction of the transfer (a load or store operation), the size of the transfer unit, the number of bytes to transfer in one burst, or other typical features of memory controllers.

De-quantizer 232 can be configured to convert data received in a first number format into a second number format. The first number format can have a lower precision than the second number format, as described herein. In some embodiments, high-precision compute tiles can include a de-quantizer 232. A high-precision compute tile can be configured to route received low-precision data to de-quantizer 232. For example, a low-precision compute tile can be configured to write output data directly into a de-quantizer of a high-precision tile. The de-quantizer can then convert the received output data into the number fan rat used by the high-precision compute tile. The converted data can then be stored in local memory 223 (e.g., using local memory controller 231 or directly by de-quantizer 232). As an additional example, a high-precision compute tile can be configured to determine whether data in a message received by a router associated with the compute tile (e.g., router 221) is in a number format having a lower precision than the number format used by the high-precision compute tile. As a further example, a high-precision compute tile can be configured to determine whether a message received by a router originated in a low-precision compute tile. When the received message contains data in a lower precision number format or originated in a low-precision compute tile, the data can be provided to the de-quantizer of the high-precision tile. The de-quantizer can then convert the received data into the number format used by the high-precision compute tile. In some embodiments, the router can provide the data to the de-quantizer based on metadata stored in the message.

The specific architecture disclosed in FIG. 2B is not intended to be limiting. As would be appreciated by those of skill in the art, compute tile 220 can include fewer components or additional components. As a non-limiting example, NPU 210 may not include one or more of router 221, function array 227, or de-quantizer 232.

Figure 3A:
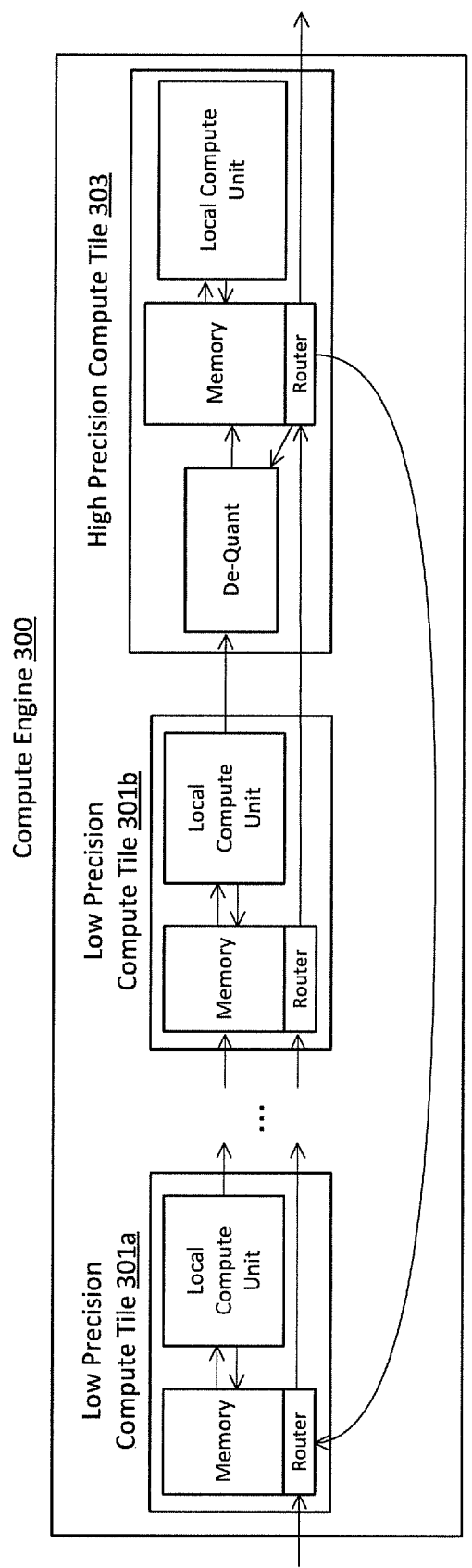
FIG. 3A depicts an exemplary compute engine implementation, in accordance with some embodiments of the present disclosure.

FIG. 3A depicts an exemplary compute engine implementation, in accordance with some embodiments of the present disclosure. In this exemplary implementation, compute engine 300 can include a plurality of low-precision compute tiles (e.g., low-precision compute tile 301*a* and compute tile 301*b*) and a high-precision tile (e.g., high-precision compute tile 303). In some embodiments, the compute engine of FIG. 3A can be configured to perform the transfer learning task described above with regards to FIG. 1, with the low-precision compute tiles configured to implement the frozen layers of the neural network and the high-precision tile configured to implement the training layers of the neural network.

Compute engine 300 can be configured to pass data between compute tiles directly or indirectly. The indirect connections can be configured to form a packet-switched network. Communication by the direct connections may be faster, but less flexible than communication over the packet-switched network. The physical topology of the network can be a linear bus, a one-way ring bus (as depicted in FIG. 3A), or the like. In some embodiments, data or instructions can be configured to enter or exit the compute engine through the packet-switched network, as shown. In various embodiments, a controller (e.g., global controller 212) or another component of a neural processing unit (e.g., NPU 210) can be part of the packet-switched network.

Compute tiles connected by direct connections can form a sequence of tiles. As shown in FIG. 3A, a low-precision compute tile (e.g., low-precision compute tile 301*a*) can be configured to write an output in a low-precision number format directly into another low-precision compute tile (e.g., low-precision compute tile 301*b*). In some instances, the output of the first low-precision compute tile can be written directly into the local memory of the second low-precision compute tile. In turn, the second low-precision compute tile can be configured to write an output directly into another compute tile. A low-precision compute tile (e.g., low-precision compute tile 301*b*) can be configured to write an output in a low-precision number format directly into a high-precision compute tile (e.g., high-precision compute tile 303). In some instances, the output of the low-precision compute tile can be written directly into a de-quantizer (e.g., de-quantizer 232 of FIG. 2B) of the high-precision tile. The de-quantizer can convert the output of the low-precision compute tile into a high-precision format. The converted output can then be stored in a local memory of the high-precision compute tile.

Figure 3B:
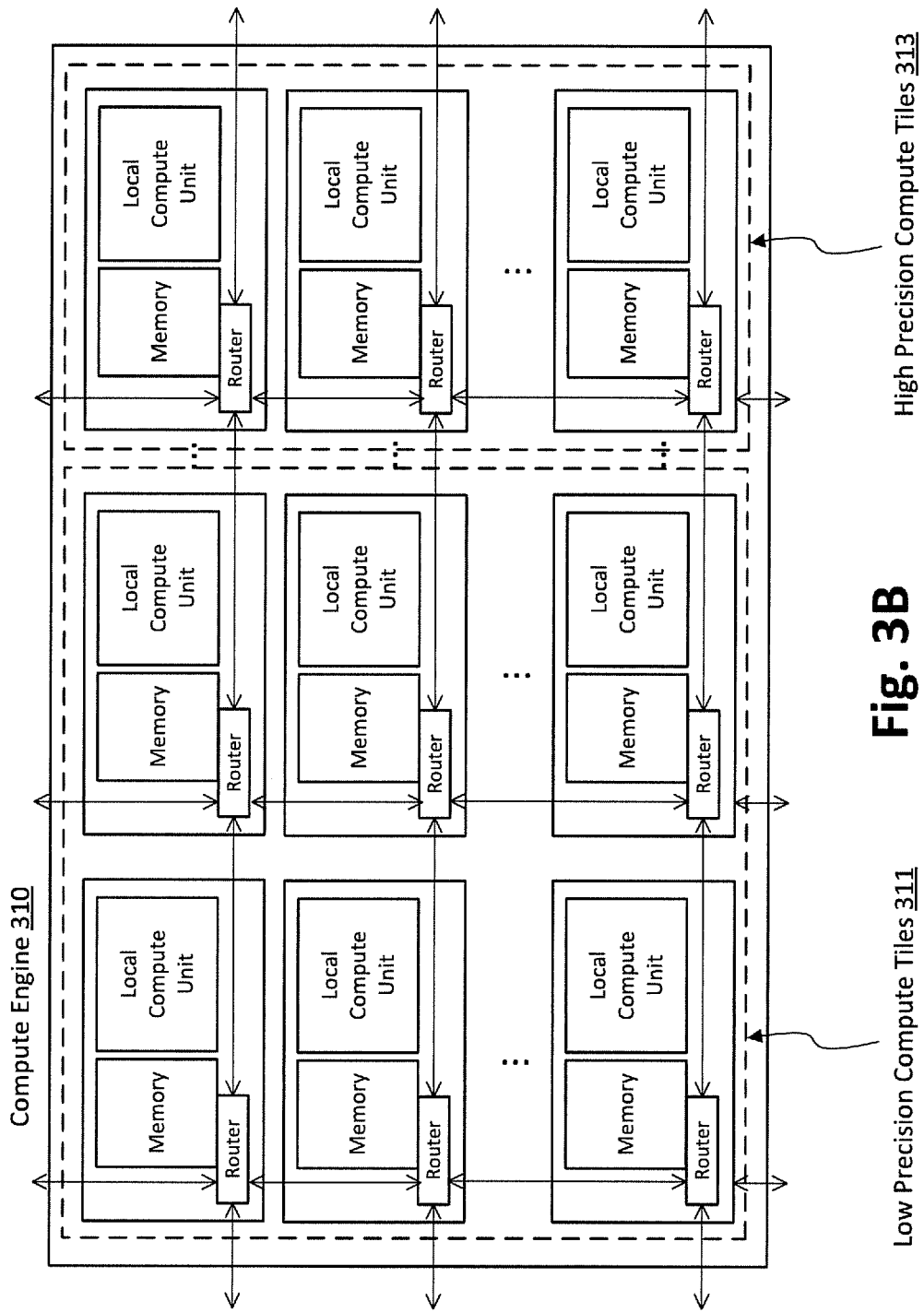
FIG. 3B depicts an additional compute engine implementation, in accordance with some embodiments of the present disclosure.

FIG. 3B depicts an additional compute engine implementation (compute engine 310), in accordance with some embodiments of the present disclosure. As show in FIG. 3B, in some embodiments, compute engine 310 can include two dimensions of compute tiles. Low-precision compute tiles 311 can include a first set of compute tiles configured to perform operations in a low-precision number format. High-precision compute tiles 313 can include a second set of compute tiles configured to perform operations in a high-precision format.

The compute tiles in compute engine 310 can be directly and indirectly interconnected, similar to the compute tiles in compute engine 300. Direct connections can connect a compute tile with one or more adjacent tiles. In some instances, one or more low-precision compute tiles can be configured to write outputs into local memories of one or more adjacent low-precision tiles. In various instances, one or more low-precision compute tiles can be configured to write outputs into de-quantizers of one or more adjacent high-precision tiles. In some instances, high-precision tiles may write outputs into local memories of one or more adjacent high-precision tiles. Indirect connections between compute tiles can be mediated by a packet switched network implemented by one or more routers. For example, as depicted in FIG. 3B, each compute tile can include a router. As shown, the routers can be physically interconnected in a 2D mesh network. The disclosed embodiments are not limited to such a 2D mesh network. Other topologies, such as a torus, linear bus, or one-way ring bus may also be used.

Similar to compute engine 300, compute engine 310 can be configured by NPU 210 to perform multiple tasks (e.g., inferential, training, or transfer learning tasks) simultaneously. The tasks can be mapped by global controller 212 to different sets of compute tiles. For example, in some embodiments a first task manager can be configured to map a first task to a first set of compute tiles, while a second task manager can be configured to map a second task to a second set of compute tiles.

Figure 3C:
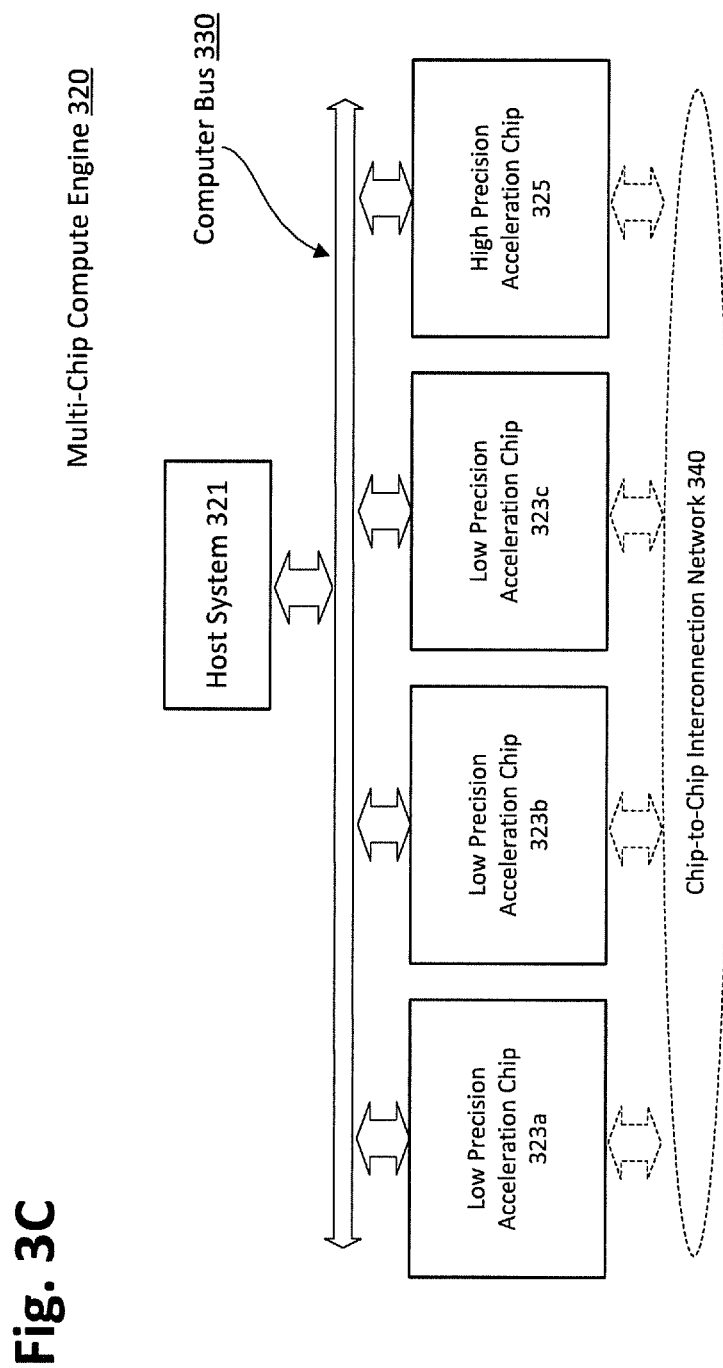
FIG. 3C depicts an exemplary multi-chip compute engine implementation, in accordance with some embodiments of the present disclosure.

FIG. 3C depicts a multi-chip compute engine implementation (multi-chip compute engine 320), in accordance with some embodiments of the present disclosure. Multi-chip compute engine 320 can include a host system 321 connected to a plurality of hardware acceleration chips. The hardware acceleration chips can include low-precision hardware acceleration chips (e.g., low-precision acceleration chips 323a to 323c) configured to perform operations in a low-precision number format and high-precision hardware acceleration chips (e.g., high-precision acceleration chip 325) configured to perform operations in a high-precision number format. Multi-chip compute engine 320 can benefit from using dedicated inference chips (e.g. inference processing units, or the like) configured to use 4-bit or 8-bit integers and dedicated training chips (e.g. training processing units, or the like) configured to use 32-bit floating point, 16-bit floating point, or 16-bit brain floating point formats. The hardware acceleration chips can be connected by a computer bus 330, such as a PCI express bus, PCI-X bus, AGP bus, or the like. In some embodiments, chip-to-chip data transfers can occur over the computer bus. Alternatively or additionally, the hardware acceleration chips can be connected directly by a chip-to-chip interconnection network 340. As a non-limiting example, when the hardware chips are all NVidia compatible GPUs, the chips could be interconnected using NVLink.

Figure 3D:
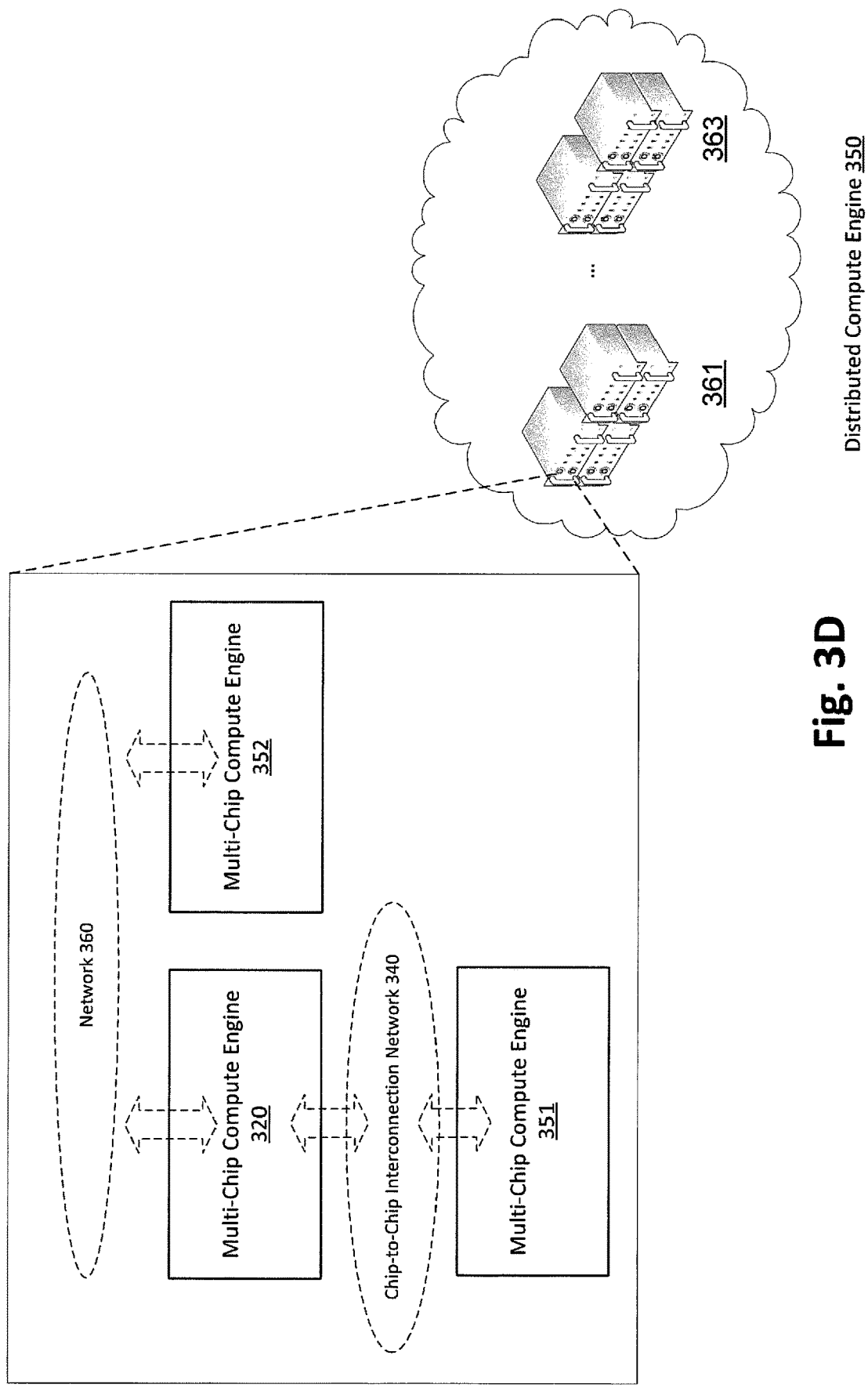
FIG. 3D depicts an exemplary distributed compute engine implementation, in accordance with some embodiments of the present disclosure.

FIG. 3D depicts a distributed compute engine implementation (distributed compute engine 350), in accordance with some embodiments of the present disclosure. As shown in FIG. 3D, multi-chip compute engines, such as those described above with regards to FIG. 3C, can be networked to create distributed compute engine 350. In some embodiments, the multi-chip compute engines can be networked using Ethernet, Infiniband, Fibre Channel, Omni-Path, or the like. For example, as shown in FIG. 3D, multi-chip compute engines 320 and 352 are connected by network 360. Data or instructions can be passed between multi-chip compute engines 320 and 352 over network 360. In some embodiments, servers connected by network 360 can implement the multi-chip compute engines. In various embodiments, each server can host at least one of an inference processing unit or a training processing unit. In some embodiments, distributed compute engine 350 can include one or more dedicated switch chips (e.g., an NVSwitch chip or the like). The dedicated switch chips can be used to speed up communication between the multi-chip compute engines (e.g., between the servers). Additionally or alternatively, the multi-chip compute engines can be networked using a chip-to-chip interconnection network. For example, as shown in FIG. 3D, multi-chip compute engines 320 and 351 are connected by chip-to-chip interconnection network 340. Data or instructions can be passed between multi-chip compute engines 320 and 351 over chip-to-chip interconnection network 340.

As shown in FIG. 3D, distributed compute engine 350 can be implemented using a cloud system. The cloud system can include a plurality of computing servers (e.g., computing servers 361 and 363). Distributed compute engine 350 can enable the cloud computing system to provide improved training, inference, and transfer learning capabilities to users of the cloud computing system. With the assistance of distributed compute engine 350, the cloud system can provide the extended AI capabilities of image recognition, facial recognition, translations, 3D modeling, and the like.

It is appreciated that the neural processing unit architecture described herein can be deployed to computing devices in other forms. For example, the neural processing unit architecture can also be integrated in a computing device, such as a smart phone, a tablet, and a wearable device. Moreover, while FIGS. 2A-3D disclose particular parallel computing architectures, it is appreciated that the disclosed embodiments are not limited to these particular architectures.

Figure 4:
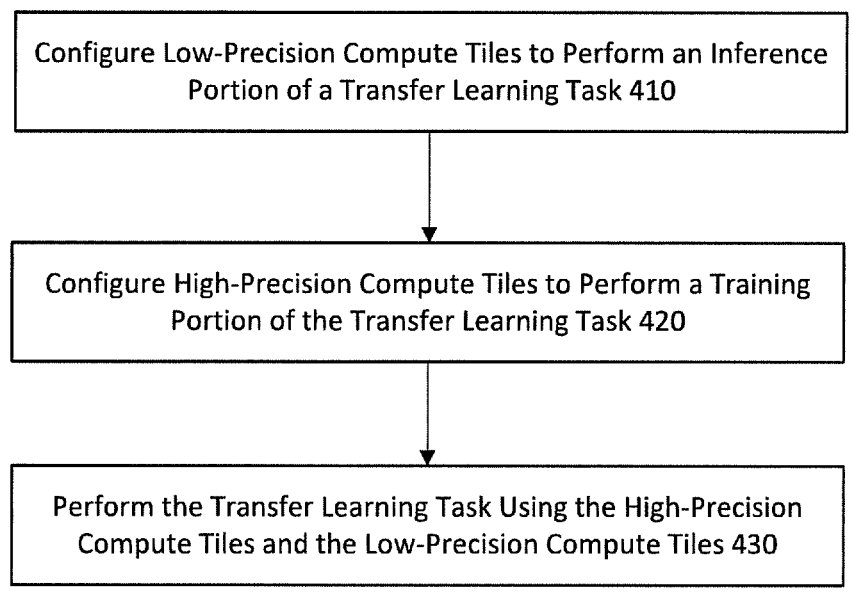
FIG. 4 depicts an exemplary method for configuring compute tiles to perform a transfer learning task, in accordance with some embodiments of the present disclosure.

FIG. 4 depicts a method 400 for configuring compute tiles to perform a transfer learning task, in accordance with some embodiments of the present disclosure. The compute tiles can include high-precision compute tiles and low-precision compute tiles. In some embodiments, a neural processing unit (e.g., NPU 210) can include the compute tiles (e.g., compute tile 220). In various embodiments, as described above with regards to FIGS. 3C and 3D, the low-precision compute tiles and the high-precision compute tiles can be included in different acceleration chips (e.g., low-precision acceleration chip 323a or high-precision acceleration chip 325), or different multi-chip compute engines (e.g., multi-chip compute engine 320 or multi-chip compute engine 351).

In some embodiments, the compute tiles can be configured using data or instructions received from a global controller (e.g., global controller 212). The global controller may have received the data or instructions from a host system or a neural processing unit. In each compute tile, instructions can be stored in an instruction buffer (e.g., instruction buffer 228) and executed in an order determined by a program controller (e.g., program controller 229). The instructions can configure a local memory controller (e.g., local memory controller 231) to generate memory addresses and initiate memory read or write cycles.

In various embodiments, the compute tiles can be configured to perform multiple tasks simultaneously. For example, in a first mode, a first subset of the low-precision tiles can be configured to perform the inference portion of the transfer learning task, while another subset of the low-precision tiles is configured to perform another inference task. This second inference task can be performed during performance of the inference portion of the transfer learning task.

In step 410, low-precision compute tiles can be configured to perform an inference portion of a transfer learning task, in accordance with disclosed embodiments. The low-precision compute tiles can be configured to perform the inference portion of the compute task in a low-precision number format. For example, the low-precision tiles can be configured to implement layers of a neural network. The layers can be the initial frozen layers used in the transfer learning task.

In some embodiments, configuring the low-precision tiles can include configuring a dataflow between the low-precision tiles and the high-precision tiles. As a non-limiting example, one or more of the low-precision tiles can be configured to directly write its output into a local memory of another low-precision tile. As a further non-limiting example, one or more of the low-precision tiles can be configured to indirectly provide its output to another low-precision tile. As an additional non-limiting example, a low-precision tile can be configured to directly write its output into, or indirectly provide its output to, a de-quantizer of a high-precision tile.

In various embodiments, the compute tiles can be configured to form a sequence. During the inference portion of the transfer learning task, data can flow along the sequence of compute tiles. The sequence of compute tiles can include low-precision compute tiles. The final low-precision compute tile in the sequence can be configured to directly write its output into, or indirectly provide its output to, a de-quantizer of a high-precision compute tile. At least one of the other low-precision compute tiles can be configured to directly write their outputs into a local memory of a subsequent low-precision compute tile in the sequence. For example, the first low-precision compute tile in the sequence can be configured to write its output directly into a local memory of the second low-precision compute tile in the sequence. In some embodiments, all of the remaining (non-final) low-precision compute tiles can be configured to directly write their outputs into the local memories of the subsequent low-precision compute tile in the sequence.

In step 420, high-precision compute tiles can be configured to perform a training portion of the transfer learning task, in accordance with disclosed embodiments. The high-precision compute tiles can be configured to perform the training portion of the compute task in a high-precision number format. In some embodiments, the high-precision tiles can be configured to implement layers of a neural network. For example, the high-precision layers can be configured to implement the non-frozen final layers of a neural network selected for a transfer learning task. Accordingly, one or more high-precision compute tiles can be configured to convert an inference input in a low-precision number format received from one or more low-precision compute tiles into a high-precision number format. The high-precision compute tiles can be configured to propagate this converted input forward through the non-frozen final layers, determine a loss, and update the non-frozen final layers by backpropagating the loss according to a backpropagation algorithm.

In some embodiments, similar to the low-precision compute tiles, instructions can configure a dataflow between two or more high-precision compute tiles. For example, the two or more high-precision compute tiles can be configured to form a sequence, in which non-final high-precision compute tiles directly write their outputs into, or indirectly provide their outputs to, subsequent high-precision compute tiles in the sequence.

In step 430, the configured low-precision and high-precision tiles can be used to perform the transfer learning task, in accordance with disclosed embodiments. Consistent with the description above with regards to FIG. 1, performance of the transfer learning task can include obtaining a training example and applying the training example to the frozen layers of a neural network implemented by the low-precision tiles to generate an inference output in a low-precision number format. Performance of the transfer learning task can further include converting the low-precision inference output into a high-precision number format and applying the converted inference output to the final, non-frozen layers of the neural network to generate a neural network output. The high-precision compute tiles can use the neural network output to determine a loss. The high-precision compute tiles can then use the loss to update the final, non-frozen layers of the neural network according to a backpropagation algorithm.

As a non-limiting example, a neural processing unit (e.g., NPU 210) can be configured to use a compute engine (e.g., compute engine 211) to perform transfer learning on a neural network having a ResNet architecture including 154 layers, implemented using a 32-bit floating point format. The compute engine can include three low-precision tiles configured to perform operations on 8-bit integers and one high-precision tile configured to perform operations on 32-bit floating point numbers, arranged as shown in FIG. 3A. Using software running on the host system, a user can indicate that the first 152 convolution and pooling layers will not be updated during the transfer learning—these layers will be frozen—and the remaining two connected layers will be updated during transfer learning. In this example, the parameters specifying the first 152 layers can be converted to the 8-bit integer format by the host system or the neural processing unit. The neural processing unit can configure a first compute tile in the compute engine (e.g., low-precision compute tile 301*a*) to implement the first 40 layers of the neural network using the converted parameter for these layers; a second compute tile in the compute engine (not shown in FIG. 3A) to implement the second 56 layers of the neural network using the converted parameter for these second 56 layers; and a third compute tile in the compute engine (e.g., low-precision compute tile 301*b*) to implement the third 56 layers of the neural network using the converted parameter for these third 56 layers. In some embodiments, each of these compute tiles can be configured to pass outputs directly to the next tile in the sequence. The neural processing unit can configure a high-precision compute tile (e.g., high-precision compute tile 303) to implement the final two fully connected layers of the neural network using the parameters for these two layers. In some embodiments, the high-precision tile can be configured to have 8-bit integer output written directly into a de-quantizer of the high-precision tile by a preceding low-precision tile in the compute sequence. In various embodiments, 8-bit integer output received over a packet-switched network of the compute engine can be routed to the de-quantizer. The de-quantizer can convert the 8-bit integer output into 32-bit floating point numbers. The converted output, represented as 32-bit floating point numbers, can then be processed using the local compute unit of the high-precision compute tile.

To continue the previous example, should the compute engine include seven low-precision tiles configured to perform operations on 8-bit integers and one high-precision tile configured to perform operations on 32-bit floating point numbers, the neural processing unit can be configured to allocate the first four low-precision tiles to another task (e.g., a separate inference task). The remaining three low-precision tiles and one high-precision tile can be configured for the transfer learning task as described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A neural network processing unit comprising: a first set of compute tiles, each comprising a first tensor array configured to support operations in a first number format; and a second set of compute tiles, each comprising: a second tensor array configured to support operations in a second number format supporting a greater range or a greater precision than the first number format; and a de-quantizer configured to convert data in the first number format to data in the second number format.

2. The neural network processing unit of clause 1, wherein the first tensor array of one of the first set of compute tiles is configurable to write an output in the first number format directly into a local memory of another one of the first set of compute tiles.

3. The neural network processing unit of clause 1 or clause 2, wherein: the first tensor array of one of the first set of compute tiles is configurable to write an output in the first number format directly into the de-quantizer of one of the second set of compute tiles.

4. The neural network processing unit of any one of clause 1 to clause 3, wherein: the neural network processing unit is configurable to perform: a first inference task using a subset of the first set of compute tiles, and a first transfer learning task using an output of the first inference task and the second set of compute tiles.

5. The neural network processing unit of clause 4, wherein: the neural network processing unit is configurable to perform: a second inference task using a second subset of the first set of compute tiles during performance of the first inference task.

6. The neural network processing unit of any one of clause 1 to clause 5, wherein: in a first mode, the neural network processing unit is configurable to: assign the first set of compute tiles to an inference task and assign a compute tile of the second set of compute tiles to a transfer learning task.

7. The neural network processing unit of any one of clause 1 to clause 6, wherein: in a second mode, the neural network processing unit is configurable to: assign a first subset of the first set of compute tiles to an inference task; and assign a second subset of the first set of compute tiles and a compute tile of the second set of compute tiles to a transfer learning task.

8. The neural network processing unit of any one of clause 1 to clause 6, wherein: compute tiles of the first and second sets are configurable to write directly into a local memory of another compute tile according to an interconnection topology; and compute tiles of the first and second sets are configurable to write indirectly into a local memory of another compute tile using one or more routers.

9. The neural network processing unit of clause 8, wherein: the one or more routers comprise a router for each compute tile.

10. The neural network processing unit of clause 8 or clause 9, wherein: the interconnection topology comprises a linear bus, a one-way ring bus, a 2d mesh, or a 2d torus.

11. The neural network processing unit of any one of clause 1 to clause 10, wherein: the first set of compute tiles are configurable to faun a sequence of compute tiles: a final compute tile in the sequence configured to provide an output of the final compute tile to a de-quantizer of one of the second set of computer tiles, and each remaining compute tile in the sequence configured to write directly an output of the remaining compute tile into a local memory of a subsequent compute tile in the sequence.

12. The neural network processing unit of any one of clause 1 to clause 11, wherein: the first number format is a two-bit integer format, an eight-bit integer format, or a four-bit integer format; and the second number format is a sixteen-bit floating point format, a thirty-two-bit floating point format, or a sixteen-bit brain floating point format.

13. A neural network processing system, comprising: at least one inference processing unit configured to support operations in a first number format; at least one training processing unit configured to support operations in a second number format, the second number format supporting a greater range or a greater precision than the first number format; and wherein the at least one inference processing units is communicatively connected to the at least one training processing unit.

14. The neural network processing system of clause 13, further comprising a host unit connected to the at least one inference processing unit and the at least one training processing unit using a computer bus.

15. The neural network processing system of clause 13 or clause 14, further comprising an interconnect topology connecting: one of the at least one inference processing unit, one of the at least one training processing unit, or one of the at least one inference processing unit and one of the at least one inference processing unit.

16. The neural network processing system of clause 15, wherein: the interconnect topology comprises a chip-to-chip interconnect topology.

17. The neural network processing system of any one of clause 13 to clause 16, further comprising: communicatively interconnected servers, each server hosting at least one of an inference processing unit or a training processing unit.

18. The neural network processing system of clause 17, further comprising: a dedicated switch unit for managing communications between the servers.

19. A neural network processing unit comprising: first tensor arrays configured to perform operations in a first number format; second tensor arrays configured to perform operations in a second number format, the second number format supporting a greater range or a greater precision than the first number format; and wherein the neural network processing unit is configurable to: in a first mode, restrict the first tensor arrays to inference tasks and restrict the second tensor arrays to training tasks; and in a second mode, assign to a transfer learning task a first subset of first tensor arrays and a first subset of the second tensor arrays.

20. The neural network processing unit of clause 19, wherein: the neural network processing unit is further configurable to: in the second mode, assign to an inference task a second subset of first tensor arrays.

21. The neural network processing unit of clause 19 or clause 20, further comprising: de-quantizers associated with the second tensor arrays and configured to convert data in the first number format to data in the second number format.

22. The neural network processing unit of clause 21, further comprising: at least one router and is configurable to transfer an output of one of the first sensor arrays to one of the de-quantizers using the at least one router.

23. The neural network processing unit of any one of clause 19 to clause 22, wherein: one of the first tensor arrays is configurable to write directly into a memory associated with another one of the first tensor arrays.

24. The neural network processing unit of any one of clause 19 to clause 23, wherein: one of the first tensor arrays is configurable to write directly into a de-quantizer associated with one of the second tensor arrays.

25. A method comprising: configuring a first set of compute tiles to perform an inference portion of a transfer learning task in a first number format; configuring a second set of compute tiles to receive an inference output in the first number format from the first set of compute tiles, convert the inference output to a second number format supporting a greater range or a greater precision than the first number format, and perform a training portion of the transfer learning task in the second number format using the converted inference output; and perform the transfer learning task using the first set of compute tiles and the second set of compute tiles.

26. The method of clause 25, wherein configuring the first set of compute tiles to perform an inference portion of a transfer learning task further comprises: configuring one of the first set of compute tiles to directly write an output in the first number format into the de-quantizer of one of the second set of compute tiles.

27. The method of clause 25 or clause 26, wherein configuring the first set of compute tiles to perform an inference portion of a transfer learning task comprises: configuring a first subset of the first set of compute tiles to perform the inference portion of the transfer learning task; and configuring a second subset of the first set of compute tiles to perform a second inference task during performance of the inference portion of the transfer learning task.

28. The method of any one of clause 25 to clause 27, wherein configuring the first set of compute tiles to perform the inference portion of the transfer learning task further comprises: configuring the first set of compute tiles to form a sequence of compute tiles, further comprising configuring a final compute tile in the sequence to provide an output of the final compute tile to a de-quantizer of one of the second set of computer tiles, and configuring each remaining compute tile in the sequence to write directly an output of the remaining compute tile into a local memory of a subsequent compute tile in the sequence.

29. The method of any one of clause 25 to clause 28, wherein: the first number format is a two-bit integer format, an eight-bit integer format, or a four-bit integer format; and the second number format is a sixteen-bit floating point format, a thirty-two-bit floating point format, or a sixteen-bit brain floating point format.

30. The method of any one of clause 25 to clause 29, wherein: the first set of compute tiles and the second set of compute tiles are part of a neural processing unit; and configuring the first set of compute tiles and the second set of compute tiles comprises providing instructions to the neural processing unit.

31. A device comprising: a host unit; and a neural processing unit configurable by the host unit to: perform operations in a first number format using a first set of compute tiles of the neural processing unit, each of the first set of compute tiles comprising a first tensor array configured to support the operations in the first number format; and perform operations in a second number format using a second set of compute tiles of the neural processing unit, each of the second set of compute tiles comprising: a second tensor array configured to support the operations in the second number format; and a de-quantizer configured to convert data in the first number format to data in the second number format.

32. The device of clause 31, wherein: the neural processing unit is further configurable by the host unit to: write outputs from the first tensor array of one of the first set of compute tiles directly into a local memory of another one of the first set of compute tiles.

33. The device of clause 31 or 32, wherein: the neural processing unit is further configurable by the host unit to: write outputs from the first tensor array of one of the first set of compute tiles, the outputs in the first number format, directly into the de-quantizer of one of the second set of compute tiles.

34. The device of any one of clauses 31 to 33, wherein: the neural processing unit is further configurable by the host unit to perform: a first inference task using a subset of the first set of compute tiles, and a first transfer learning task using an output of the first inference task and the second set of compute tiles.

35. The device of clause 34, wherein: the neural processing unit is further configurable by the host unit to perform: a second inference task using a second subset of the first set of compute tiles during performance of the first inference task.

36. The device of any one of clauses 31 to 35, wherein: the neural processing unit is further configurable by the host unit to enter a first mode, the neural processing unit in the first mode configured to: assign the first set of compute tiles to an inference task; and assign a compute tile of the second set of compute tiles to a transfer learning task.

37. The device of any one of clauses 31 to 36, wherein: the neural processing unit is further configurable by the host unit to enter a second mode, the neural processing unit in the second mode configured to: assign a first subset of the first set of compute tiles to an inference task; and assign a second subset of the first set of compute tiles and a compute tile of the second set of compute tiles to a transfer learning task.

38. The device of any one of clauses 31 to 37, wherein: compute tiles of the first and second sets are configurable to write directly into a local memory of another compute tile according to an interconnection topology; and compute tiles of the first and second sets are configurable to write indirectly into a local memory of another compute tile using one or more routers.

39. The device of clause 38, wherein: the one or more routers comprise a router for each compute tile.

40. The device of clause 38 or clause 39, wherein: the interconnection topology comprises a linear bus, a one-way ring bus, a 2d mesh, or a 2d torus.

41. The device of any one of clause 31 to clause 40, wherein: the first set of compute tiles are configurable to form a sequence of compute tiles: a final compute tile in the sequence configured to provide an output of the final compute tile to a de-quantizer of one of the second set of computer tiles, and each remaining compute tile in the sequence configured to write directly an output of the remaining compute tile into a local memory of a subsequent compute tile in the sequence.

42. The device of any one of clause 31 to clause 41, wherein: the first number format is a two-bit integer format, an eight-bit integer format, or a four-bit integer format; and the second number format is a sixteen-bit floating point format, a thirty-two-bit floating point format, or a sixteen-bit brain floating point format.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A neural network processing unit comprising:
   first low-precision compute tiles including first tensor arrays configured to perform operations in a first number format;
   second high-precision compute tiles including second tensor arrays configured to perform operations in a second number format, the second number format supporting a greater range or a greater precision than the first number format; and
   wherein the neural network processing unit is configurable to:
      in a first mode, restrict the first low-precision compute tiles to inference tasks and restrict the second high-precision compute tiles to training tasks; and
      in a second mode, in response to a request to perform a transfer learning task:
         configure a first subset of the first low-precision compute tiles to implement frozen layers of a first neural network and a first subset of the second high-precision compute tiles to implement at least one unfrozen layer of the first neural network; and
      train the at least one unfrozen layer of the first neural network.

2. The neural network processing unit of claim 1, wherein: the neural network processing unit is further configurable to:
   in the second mode, in response to a request to perform an inference task:
      configure a second subset of the first low-precision compute tiles to implement layers of a second neural network;
      generate an interferential output using the layers of the second neural network.

3. The neural network processing unit of claim 1:
   wherein the neural network processing unit is further configured, in response to the request to perform the transfer learning task, to convert output data of the first subset of the first low-precision compute tiles in the first number format into input data to the first subset of the second high-precision compute tiles in the second number format.

4. The neural network processing unit of claim 3, wherein: the neural network processing unit further comprises at least one router; and
   is further configurable to transfer the output data to one of the second tensor arrays using the at least one router for conversion into the second number format.

5. The neural network processing unit of claim 1, wherein: one of the first tensor arrays is configurable to write directly into a memory associated with another one of the first tensor arrays.

6. The neural network processing unit of claim 1, wherein: one of the first tensor arrays is configurable to write directly into a compute tile
   containing one of the second tensor arrays for conversion into the second number format.

7. The neural network processing unit of claim 1, wherein:
the first number format is a two-bit integer format, an eight-bit integer format, or a four-bit integer format; and
the second number format is a sixteen-bit floating point format, a thirty-two-bit floating point format, or a sixteen-bit brain floating point format.

8. The neural network processing unit of claim 1, wherein:
the first low-precision and second high-precision compute tiles are each configurable to write directly into a local memory of another compute tile according to an interconnection topology; and
the first low-precision and second high-precision compute tiles are each configurable to write indirectly into local memories of other compute tiles using one or more routers.

9. The neural network processing unit of claim 8, wherein:
the one or more routers comprise a router for each of the first low-precision and second high-precision compute tiles.

10. The neural network processing unit of claim 8, wherein:
the interconnection topology comprises a linear bus, a one-way ring bus, a 2d mesh, or a 2d torus.

11. A method comprising:
configuring a first set of low-precision compute tiles to implement frozen layers of a neural network;
configuring a second set of high-precision compute tiles to implement at least one unfrozen layer of the neural network, the configuration comprising:
configuring the second set of high-precision compute tiles to receive an inference output in a first number format from the first set of compute tiles, and
configuring the second set of high-precision compute tiles to convert the inference output to a second number format supporting a greater range or a greater precision than the first number format; and
performing an inference portion of a transfer learning task on the neural network using the first set of low-precision compute tiles in the first number format and performing a training portion of the transfer learning task using the second set of high-precision compute tiles in the second number format.

12. The method of claim 11, wherein configuring the first set of low-precision compute tiles to perform the inference portion of the transfer learning task further comprises:
configuring one of the first set of low-precision compute tiles to directly write an output in the first number format into one of the second set of low-precision compute tiles for conversion into the second number format.

13. The method of claim 11, wherein configuring the first set of low-precision compute tiles to implement the frozen layers of the neural network comprises:
configuring a first subset of the first set of low-precision compute tiles to perform the inference portion of the transfer learning task; and
configuring a second subset of the first set of low-precision compute tiles to perform a second inference task during the performance of the inference portion of the transfer learning task.

14. The method of claim 11, wherein configuring the first set of low-precision compute tiles to implement the frozen layers of the neural network comprises:
configuring the first set of low-precision compute tiles to form a sequence of compute tiles, further comprising:
configuring a final compute tile in the sequence to provide an output of the final compute tile to one of the second set of high-precision compute tiles for conversion into the second number format, and
configuring each remaining compute tile in the sequence to write directly an output of the remaining compute tile into a local memory of a subsequent compute tile in the sequence.

15. The method of claim 11, wherein:
the first number format is a two-bit integer format, an eight-bit integer format, or a four-bit integer format; and
the second number format is a sixteen-bit floating point format, a thirty-two-bit floating point format, or a sixteen-bit brain floating point format.

16. The method of claim 11, wherein:
the first set of low-precision compute tiles and the second set of high-precision compute tiles are part of a neural processing unit; and
configuring the first set of low-precision compute tiles and the second set of high-precision compute tiles comprises providing instructions to the neural processing unit.

17. The method of claim 11, wherein performing the transfer learning task comprises:
before completing updating of the at least one unfrozen layer of the neural network based on a first training example using the second set of high-precision compute tiles,
beginning calculation of an output based on a second training example using the first set of low-precision compute tiles.

18. A non-transitory, computer-readable medium containing instructions that, when executed by a system comprising a neural network processing unit, causes the system to perform operations comprising:
configuring a first set of low-precision compute tiles of the neural network processing unit to implement frozen layers of a neural network;
configuring a second set of high-precision compute tiles of the neural network processing unit to implement at least one unfrozen layer of the neural network, the configuration comprising:
configuring the second set of high-precision compute tiles to receive an inference output in a first number format from the first set of compute tiles, and
configuring the second set of high-precision compute tiles to convert the inference output to a second number format supporting a greater range or a greater precision than the first number format; and
performing an inference portion of a transfer learning task using the first set of low-precision compute tiles in the first number format and performing a training portion of the transfer learning task using the second set of high-precision compute tiles in the second number format.

19. The non-transitory, computer-readable medium of claim 18, wherein configuring the first set of low-precision compute tiles to perform the inference portion of the transfer learning task further comprises:
configuring one of the first set of low-precision compute tiles to directly write an output in the first number format into one of the second set of high-precision compute tiles for conversion into the second number format.

20. The non-transitory, computer-readable medium of claim 18, wherein configuring the first set of low-precision compute tiles to implement the frozen layers of the neural network comprises:
- configuring a first subset of the first set of low-precision compute tiles to perform the inference portion of the transfer learning task; and
- configuring a second subset of the first set of low-precision compute tiles to perform a second inference task during the performance of the inference portion of the transfer learning task.

21. The non-transitory, computer-readable medium of claim 18, wherein configuring the first set of low-precision compute tiles to implement the frozen layers of the neural network comprises:
- configuring the first set of low-precision compute tiles to form a sequence of compute tiles, further comprising:
  - configuring a final compute tile in the sequence to provide an output of the final compute tile to one of the second set of high-precision compute tiles for conversion into the second number format, and
  - configuring each remaining compute tile in the sequence to write directly an output of the remaining compute tile into a local memory of a subsequent compute tile in the sequence.

22. The non-transitory, computer-readable medium of claim 18, wherein:
- the first number format is a two-bit integer format, an eight-bit integer format, or a four-bit integer format; and
- the second number format is a sixteen-bit floating point format, a thirty-two-bit floating point format, or a sixteen-bit brain floating point format.

23. The non-transitory, computer-readable medium of claim 18, wherein:
- the first set of low-precision compute tiles and the second set of high-precision compute tiles are part of a neural processing unit; and
- configuring the first set of low-precision compute tiles and the second set of high-precision compute tiles comprises providing instructions to the neural processing unit.

* * * * *